Patented Oct. 13, 1953

2,655,487

UNITED STATES PATENT OFFICE 2,655,487

TETRAHYDROPHTHALIC ACID HALF ESTER COMPOUNDS

Alexander C. Keyl, Bensenville, and Robert H. Geils, Downers Grove, Ill., assignors to Fred'k A. Stresen-Reuter, Inc., a corporation of Illinois No Drawing. Application September 27, 1950, Serial No. 187,130

14 Claims. (Cl. 260—22)

This invention relates to substantially stable monomeric half ester compounds of polyhydroxy aliphatic alcohols having at least three hydroxyl groups, one of which has been esterified with a fatty acid and another of which has been esterified with tetrahydrophthalic acid or its derivatives, in a manner to allow a free carboxyl group and at least one free hydroxyl group in the molecule, and to the method of forming such compounds. This invention further relates to a method of converting the half ester monomeric compound of the present invention to a resin, and it also relates to the resinous product.

The monomeric compounds of the present invention have the following structural formula:

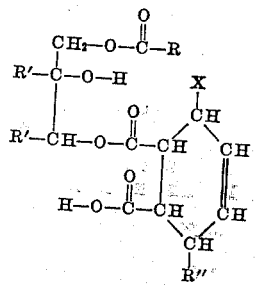

or the isomeric structure wherein some of the half ester is upon a different hydroxyl:

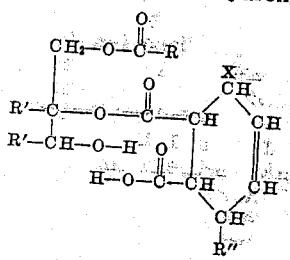

wherein R is the alkyl, alkenyl, or hydroxy alkenyl typical long chain residue of saturated or unsaturated fatty acids including drying oil fatty acids, generally derivable by hydrolysis or saponification of commercial animal, fish and vegetable oils and fats. Such fatty acids may contain 12 to 22 carbon atoms and preferably 17 to 22 carbon atoms; R' is hydrogen or a lower alkyl group, having 1 to 3 carbon atoms which may additionally be substituted with up to three hydroxyl groups distributed not more than one hydroxyl group for each carbon atom; R'' is hydrogen or a monocarbocyclic 5 or 6 carbon atom ring radical, which may further contain lower alkyl substituents, such as phenyl, toluyl, cyclo- hexyl, methyl cyclopentyl; or an alkyl radical having 1 to 16 (or an alkenyl radical having 2 to 16) carbon atoms such as methyl, ethyl, ethylene, propyl, propenyl, butyl, isobutenyl, di isobutyl, n-octyl, decyl, decenyl, dodecyl, oleyl and hexadecyl; and X is hydrogen or halogen such as chlorine or bromine.

The monomeric compounds hereof are substantially stable oily fluids useful as such, as plasticizers, wetting agents, emulsifying agents and resin intermediates for formation of alkyd type resins by direct polymerization as pointed out below or formation of other alkyd type resins of controlled characteristics as pointed out in our co-pending application Serial No. 187,129 filed on even date herewith.

It is known in the art to form alkyd type resins by reaction of glycerine or monoglycerides with tetrahydrophthalic acid as taugt in U. S. Patent 1,860,730. However, the reaction of such components is rapid and uncontrollable to form resinous products of indefinite structure and uncontrollable characteristics. Moreover, it has been suggested by Diels-Alder Ann. 1928, 460, page 98; Chem. Abs. 1928, 22, 1144, to react maleic anhydrid with 1,3 butadiene to produce tetrahydrophthalic anhydrid, but this reaction is operative only under such carefully controlled reaction conditions, to avoid reaction with substantially explosive violence, that the Diels-Alder reaction has not been commercially practicable to directly produce this compound.

According to the method of this invention we first produce a mono fatty acid ester of a polyhydroxy alcohol having a residue after esterification containing at least two free hydroxyl groups. This product is then reacted with maleic or fumaric acid or the anhydrid thereof to form a half ester having at least one free hydroxyl and one free carboxyl radical. This half ester is reactable with a 1,3 diene by the Diels-Alder synthesis to produce, in an easily controlled reaction, the tetrahydrophthalic acid derivatives of the present invention.

1. *Formation of mono fatty acid ester of polyhydroxy aliphatic alcohol*

As indicated above any polyhydroxy aliphatic alcohol within the scope of the formula:

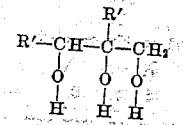

wherein R' is hydrogen or a 1 to 3 carbon atom alkyl which may additionally contain up to 3 hydroxyl groups distributed not more than one hydroxyl for each carbon atom, such as glycerine, mannitol, sorbitol, pentaerythritol, and the methyl, ethyl or propyl derivatives thereof is reacted with a fatty acid to form the monoester. A preferred source of materials from which mono fatty esters of the polyhydroxy alcohol is formed is natural occurring triglycerides of the fixed oils of commerce. Such fixed oils are fish oil, lard, stearin, palm oil, cocoanut oil, soy bean oil, tung oil, linseed oil, oiticica oil, and castor oil, which may be converted to the monoglyceride preferably by the following reaction:

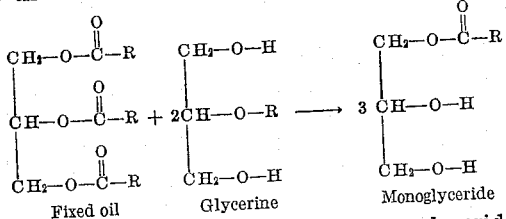

Fixed oil      Glycerine      Monoglyceride

Other known methods of forming monoglycerides such as by direct esterification of any polyhydric alcohol with a fatty acid or compound thereof may be used or a different polyhydric alcohol may be substituted for glycerine in the above reaction to give a mixture of mono fatty acid esters with different alcohols. Similarly a mixture of triglycerides having different fatty acids may be reacted with glycerine to obtain a mixture of monoglycerides having different fatty acid radicals. This reaction to form the monoglyceride is effected by heating 2 mols of glycerine with one mol of triglyceride at a temperature of 425 to 450° F. preferably about 440° F. for a period of several hours such as 3 to 6 hours, with constant stirring and preferably in an inert atmosphere such as carbon dioxide or nitrogen.

2. Formation of maleic or fumaric half ester of the mono fatty ester

The mono fatty ester as described above is then reacted with maleic or fumaric acid or anhydride, preferably maleic anhydride, to form a half ester according to the following reaction:

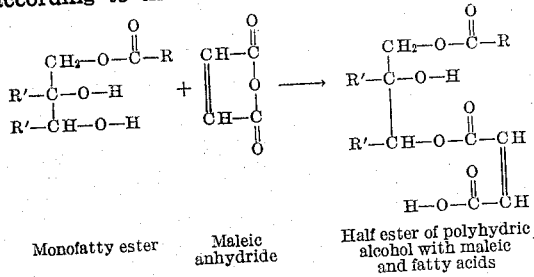

Monofatty ester      Maleic anhydride      Half ester of polyhydric alcohol with maleic and fatty acids In this reaction R and R' have the same significance listed above, and either fumaric or maleic acid may be substituted for the maleic anhydride. In effecting the reaction equal molar proportions of the maleic anhydride and mono fatty acid ester are heated together at a temperature of 150 to 180° F. for a period of 1 to 5 hours, the exact end point being determined by measuring the acid number, which may be calculated from the formula of the compound to be obtained. For example, a non-conjugated fatty acid monoglyceride with approximately a 16 carbon atom fatty acid reacted with maleic anhydride has a theoretical acid value for the half ester of 123. In this temperature range of about 150 to 180° F. the maleic carboxyl radical tends to esterify only the hydroxyl group in the 3 position with respect to the fatty glyceride and, reacting at the upper end of such range, about 180° F., such isomer is obtained almost exclusively. Some esterification, up to about 20% of the total half ester produced, will take place on the hydroxyl in the 2 position with respect to the fatty glyceride when the reaction is run at the lower end of the temperature range, at about 150° F. Thus in the reaction on monoglycerides over the temperature range given, a mixture of half ester isomers may be obtained containing up to about 20% of esters in the 2 hydroxyl position. Where the alcohol contains more than three hydroxyls, maleic half esters in the 3 position of the polyhydric alcohol will predominate, but the half ester product will contain minor proportions of isomeric maleic half esters on other hydroxyl positions.

3. Formation of the tetrahydrophthalic acid half ester

The maleic fatty acid half ester obtained as described above is reacted with a 1,3 diene to obtain in an easily controlled Diels-Alder condensation, the tetrahydrophthalic acid half ester intermediate of the present invention. The following equation illustrates this reaction:

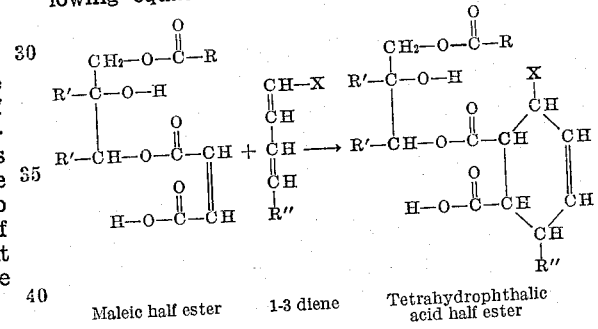

Maleic half ester      1-3 diene      Tetrahydrophthalic acid half ester where R, R', R'' and X have the significance given above. In this instance

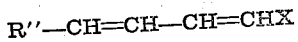

is the 1-3 dienic derivative of the radicals listed above for R'' and includes such specific compounds as 4-phenyl butadiene 1-3, 4-p toluyl butadiene 1-3, 4-cyclohexyl butadiene 1-3, 4-(2 methyl cyclo pentyl) butadiene 1-3, butadiene 1-3, 1-chloro pentadiene 1-3, 4-iso propyl butadiene 1-3, hexadiene 1-3, di isobutyl butadiene 1-3, heptadiene 1-3, octadiene 1-3, 1-bromo pentadiene 1-3, 4-dodecyl butadiene 1-3, and octadecyl butadiene 1-3.

The reaction between the 1-3 diene and the maleic half ester is effected by mixing the diene and the maleic acid half ester in equimolar proportions, and heating the mixture at a moderate temperature of about 85 to 150° F., preferably 115 to 125° F. over a period of 2 to 48 hours. The reaction time will vary with applied pressure, and becomes considerably shorter at higher pressures. For example, practical pressures of 2 to 30 pounds per square inch (p. s. i.) are the usual range for commercially available autoclaves. Higher pressures up to 100 p. s. i. may be used in more expensive equipment capable of withstanding such pressure. In general it is preferred to carry out the reaction in the temperature range given at a pressure 10 to 30 p. s. i. over a period of 3 to 40 hours, usually about 5 to 10 hours, for maximum economy and yields. The reaction vessel may be made of any usual metal such as nickel or steel but preferably containing no copper or alloy thereof which has a catalytic effect on the reaction materials. The reaction vessel may also be glass lined if desired and it is fitted with a mechanical stirrer. The butadiene which is normally gaseous may be added either as condensed into a liquid or as a gas, to the reaction mixture as the reaction proceeds.

The product obtained is a viscous fluid stable indefinitely at ordinary temperatures, soluble in hydrocarbon as well as polar solvents. The product is identifiable by its acid value which may be calculated from the formula, for example the tetrahydrophthalic acid half ester monoglyceride having an average of 16 carbon atoms in the fatty acid, has an acid value of 105.5. Such product dissolved to a 70% solution in xylene has a color value of 8 (Gardner) and a viscosity of A-1 (Gardner-Holdt).

This intermediate has a wide utility for various uses. Where the fatty acid is saturated, the half ester hereof is substantially non-oxidizing and stable in air at normal temperatures. It is useful as a wetting or emulsifying agent, or as a plasticizer. The product will have drying characteristics when exposed to air, where the fatty acid derivative is made from a drying oil fatty acid. The drying oil fatty acid half ester has utility as an additive for various drying oils and resins for modification thereof. Any of the half ester products hereof are stable indefinitely at normal temperatures but can be directly condensed to an alkyd type resinous body.

4. Formation of resin from half ester

As pointed out in our above-mentioned copending application, the half ester of the present invention can be further modified prior to or simultaneously with conversion to a resin, but according to the present invention the intermediate half ester may be directly condensed to an alkyd type of resin by heating the same in the presence of a solvent in an azeotropic distillation to continuously remove water of condensation. Various solvents which will distill azeotropically with water are useful but we prefer hydrocarbon solvents, typically aromatic or aliphatic naphthas, preferably such as are sufficiently stable or saturated to avoid formation of resinous bodies from the solvent material per se. Thus, commercial toluene, xylene or saturated petroleum naphtha having a boiling point in the range of 225 to 400° F. are suitable solvents for azeotropic resin formation.

In effecting the resinification of the intermediate, it is first dissolved as a concentrated solution in the solvent, for example a 50 to 80% solution, and then distilled, preferably condensing the distillate outside of the system, allowing the water and solvent to separate, and continuously recycling the solvent to the solution as it is being distilled. The temperature of the distillation will depend upon the distillation point of the particular azeotropic mixture of solvent and moisture. The extent of resinification is governed largely by the amount of condensation which is allowed to take place. Thus the product may be resinified by distilling to an end point at which no more water comes over, or the condensation may be stopped at some intermediate point by condensing to a preselected acid value.

Other known methods of azeotropic distillation such as a high pressure steam distillation may also be applied to the intermediate dissolved in the solvent to effect resinification thereof. The resin may be further modified by having dissolved in the solvent prior to resinification other resins, preferably alkyd resins, plasticizers such as tricresyl phosphate or dibutyl phthalate, colors, or driers such as the naphthenates, linoleates or oleates of lead, manganese, cobalt or copper, which tend to modify the final properties of the resin solution obtained after condensation. In a final step the solvent is removed by distillation at the boiling point thereof or by distillation in vacuo.

As thus described a tetraphthalic acid half ester intermediate, stable in storage, is prepared under easily controllable reaction conditions which has widely variable uses. The intermediate is capable of modification as to the type of fatty acid used, the type of polyhydric aliphatic alcohol esterified therewith and certain other modifications obtainable by having easily formed variable derivatives of the tetrahydrophthalic acid itself by condensing with various 1-3 dienes.

The following examples will illustrate the practice of this invention:

EXAMPLE I

*a.* Fatty acids obtained by saponification of soy bean oil with a 10% sodium hydroxide solution and subsequent acidification with hydrochloric acid to obtain free soy bean oil fatty acids, are dried and mixed with an equimolar proportion of glycerine and heated with continuous stirring at 440° F. for four hours under a blanket of carbon dioxide gas obtained by continuously passing of carbon dioxide gas over the rapidly stirred fluid mixture. At the end of this period the product was cooled and found to have an acid value of 1.8 indicating substantial neutrality, a color of 10-11 (Gardner) and a viscosity of G-H (Gardner-Holdt).

*b.* The fatty acid monoglyceride obtained in paragraph *a* is mixed with an equimolar quantity of maleic anhydride and heated with stirring under a carbon dioxide gas blanket at a temperature of 180° F. After heating for approximately an hour a series of acid values were taken each ten minutes and the reaction was terminated in an hour and 20 minutes when an acid value of 122.70 was obtained. The product here had a viscosity of V- (Gardner-Holdt) and a color of 11 (Gardner).

*c.* The half ester of maleic acid obtained in paragraph *b* was sealed in an autoclave equipped with a mechanical stirrer with an equimolar quantity of liquid 1,3 butadiene and the mixture was heated for 36 hours at a pressure of 10 p. s. i. and a temperature of 115° F. At the end of this period the autoclave was cooled and the half ester liquid of tetrahydrophthalic acid obtained was dissolved in xylene to form a 70% solution therein. This solution had an A-1 viscosity (Gardner-Holdt) and a color of 8 (Gardner). The intermediate compound had an acid value of 105.4.

*d.* A tetrahydrophthalic acid half ester obtained as described in paragraph *c* was dissolved in xylene to form a 48% solution of non-volatile solids in xylene. The solution was placed in an ordinary still and fitted with a condenser from which the condensate could be separated into layers of solvent and water azeotropically distilled therewith, and the solvent layer recycled to the still. The distillation is carried out by continuous distillation at a temperature of approximately 334° F. to yield a solution of resin in xylene. The resin solution obtained after distilling for two hours had a viscosity of A-1 (Gardner-Holdt), a color of 9-10 (Gardner) and an acid value of 12. To the solution of 48% non-volatile resinified solids in xylene, a drier comprising a mixture of a 0.5% lead naphthenate based upon the and 0.05% cobalt naphthenate based upon the non-volatile solids was added. The solution was then distributed as a film on glass and air dried. The film was found to have a slight tack to paper after six hours and was tack free to paper in 24 hours. The film was transparent and comprised the self polymerized intermediate of tetrahydrophthalic acid and soy bean oil fatty acid monoglyceride.

EXAMPLE II

A similar procedure as set forth in Example I was used to prepare an intermediate tetrahydrophthalic acid and linseed oil fatty acids. The product was resinified to an alkyd resin by condensation in the manner described in Example I and it dried tack-free to paper in 12 hours and had only a slight tack in 3½ hours, similarly using a standard drier.

The resin of the present invention, itself, as indicated above, is subject to considerable modification as to the fatty acid and the specific polyhydric alcohol and with various derivatives of tetrahydrophthalic acid. It is accordingly intended that the examples given herein be regarded as illustrative and not limiting except as defined in the claims appended hereto.

We claim:

1. The method of forming a monomeric tetrahydrophthalic acid half ester compound comprising esterifying a mono 12 to 22 carbon atom fatty acid ester of a polyhydroxy aliphatic alcohol having at least two free hydroxyl groups with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

2. The method of forming a tetrahydrophthalic acid half ester of a fatty acid monoglyceride comprising condensing a 12 to 22 carbon atom fatty acid monoglyceride half ester of maleic acid containing at least one free hydroxyl radical and one free carboxyl radical with a 1,3 diene.

3. The method of forming a tetrahydrophthalic acid half ester of a fatty acid monoglyceride comprising condensing a 12 to 22 carbon atom fatty acid monoglyceride half ester of maleic acid containing at least one free hydroxyl radical and one free carboxyl radical with 1,3 butadiene.

4. The method of forming an alkyd resin comprising dissolving a tetrahydrophthalic acid half ester of a 12 to 22 carbon atom fatty acid monoester of a polyhydroxy aliphatic alcohol having at least one free hydroxyl group and one free carboxyl group in a solvent and heating the solution and thereby azeotropically distilling said solvent and water of condensation from the solution.

5. The method of forming a monomeric tetrahydrophthalic acid half ester compound comprising esterifying a linseed oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

6. The method of forming a monomeric tetrahydrophthalic acid half ester compound comprising esterifying a mono 12 to 22 carbon atom fatty acid ester of a polyhydroxy aliphatic alcohol having at least two free hydroxyl groups with one carboxyl radical of an acid selected from the group consisting of maleic acid, fumaric acid and anhydrides thereof to form a half ester therewith, and then condensing said half ester with 1,3 butadiene to form a tetrahydrophthalic acid half ester containing at least one free hydroxyl radical and one free carboxyl radical.

7. The method of forming a tetrahydrophthalic acid half ester of a fatty acid monoglyceride comprising condensing a 12 to 22 carbon atom fatty acid monoglyceride half ester of an acid selected from the group consisting of maleic acid, fumaric acid and anhydrides thereof, containing at least one free hydroxyl radical and one free carboxyl radical, with a 1,3 diene.

8. The method of forming a monomeric tetrahydrophthalic acid half ester compound comprising esterifying a soy bean oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

9. The method of forming a monomeric tetrahydrophthalic acid half ester compound comprising esterifying a tung oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

10. The method of forming a monomeric tetrahydrophthalic acid half ester compound comprising esterifying a castor oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

11. The method of forming a monomeric tetrahydrophthalic acid half ester compound comprising esterifying a cocoanut oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

12. The method of forming a monomeric tetrahydrophthalic acid half ester compound comprising esterifying a saturated fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

13. The method of forming a monomeric tetrahydrophthalic acid half ester compound comprising esterifying an unsaturated fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

14. The method of forming a monomeric tetrahydrophthalic acid half ester compound comprising esterifying a drying oil fatty acid monoglyceride with one carboxyl radical of an acid selected from the group consisting of maleic acid, fumaric acid and anhydrides thereof to form a half ester therewith, and then condensing said half ester with a 1,3 diene to form a tetrahydrophthalic acid half ester containing at least one free hydroxyl radical and one free carboxyl radical.

ALEXANDER C. KEYL.
ROBERT H. GEILS.

References Cited in the file of this patent

UNITED STATES PATENTS

| Number | Name | Date |
|---|---|---|
| 1,860,730 | Brooks | May 31, 1932 |
| 2,057,765 | Brubaker | Oct. 20, 1936 |
| 2,251,297 | Soday | Aug. 5, 1941 |
| 2,404,836 | Gerhart et al. | July 30, 1946 |